United States Patent [19]

Bennett

[11] Patent Number: 5,259,992
[45] Date of Patent: Nov. 9, 1993

[54] CONDUCTIVIZING COATING SOLUTIONS AND METHOD OF FORMING CONDUCTIVE COATING THEREWITH

[75] Inventor: Everett W. Bennett, East Hampton, Mass.

[73] Assignee: Rexham Graphics Inc., South Hadley, Mass.

[21] Appl. No.: 835,573

[22] Filed: Feb. 14, 1992

[51] Int. Cl.$^5$ .............................................. H01B 1/00
[52] U.S. Cl. .................................. 252/518; 252/500; 430/63; 430/64; 106/1.22; 106/1.26; 427/101; 427/226; 427/229
[58] Field of Search ............... 252/500, 510, 512, 518; 430/63, 64, 65, 66; 106/1.22, 1.23, 1.26; 427/101, 226, 229

[56] References Cited

U.S. PATENT DOCUMENTS

| | | | |
|---|---|---|---|
| 3,245,833 | 4/1966 | Trevoy | 252/518 |
| 3,597,272 | 8/1971 | Gramza et al. | 427/74 |
| 3,740,217 | 6/1973 | Gramza et al. | 430/63 |
| 4,122,143 | 10/1978 | Momotari et al. | 252/518 |
| 5,063,128 | 11/1991 | Yuh et al. | 430/63 |

OTHER PUBLICATIONS

Vogler et al, "Photoluminescence of Tetrameric Copper (I) Iodide Complexes" J. Am. Chem. Soc., (1986), 108, pp. 7211–7212.
Raston et al. "Crystal Structure of the Copper(I) Iodide–Pyridine (1/1) Tetramer", J. C. Dalton (1976), pp. 2153–2156.
Lindemann et al, "Kurze Originalmitteilungen", Naturwissenschaften 61, Sringer-Verlag, (1974), pp. 500–501.
Davies et al, "Homogeneous Oxidative Coupling Catalysts", Advances in Chemistry Series, No. 173, Inorganic Compounds with Unusual Properties, II, (1979), pp. 178–194.
Davies et al, "A Spectrophotometric Study of the Reactions of the Phenolic Oxidative Coupling Initiator py$_4$-Cu$_4$Cl$_4$O$_2$ and of py$_4$Cu$_4$Cl$_6$O with Pyridine", Inorganica Chimica Acta, 71 (1983), pp. 95–99.
Karlin et al, "Dioxygen–Copper Reactivity: Generation, Characterization, and Reactivity of a Hydroperoxo–Dicopper(II) Complex", J. Am. Chem. Soc. (1988), 110, pp. 6769–6780.
Dietrich-Buchecker et al, "Bis(2,9-diphenyl-1, 10-phenanthroline)copper(I): a Copper Complex wtih a Long–lived Charge-transfer Excited State", J. Chem. Soc., Chem. Commun., (1983), pp. 513–515.
Floriani et al, "Aggregation of Metal Ions with Functionalized Calixarenes: Synthesis and Structue of an Octanuclear Copper(I) Chloride Complex", Angew. Chem. Int. Ed. Engl. 28, (1989), No. 10, pp. 1376–1377.
Vogler et al, "Copper(I)–Assisted Formation of an Organic" Sandwich Structure: Structural Prerequisites for Luminescence of the Dinuclear Complexes[-($\mu$-Bipyrimidine) {Cu(PR$_3$)$_2$}]X$_2$, Angew. Chem. Int. Ed. Engl. 28 (1989), No. 12, pp. 1659–1660.
Gol et al, "[Cu$_8$(iPrPCH$_2$PiPR)$_2$Cl$_4$(py)$_5$], a Novel Cu Cluster Containing Pentacoordinated Phosphorus in $\mu_3$-PRR' Bridges (R=iPR, R'=CH$_2$PiPr)", Angew. Chem. Int. Ed. Engl. 27 (1988), No. 7, pp. 956–957.
Scattergood et al, "Synthesis and Characterisation of [VS$_4$(CuPPh$_3$)$_5$(CuCl)Cl$_2$]. CH$_2$Cl$_2$; a Compound containing a Tetrahedral V'S$_4$ Core Encapsulated by an Octahedral Array of Copper(I) Atoms", Journal of Chemical Society, No. 23, (1987), pp. 1749–1750.

(List continued on next page.)

Primary Examiner—Paul Lieberman
Assistant Examiner—M. Kopec
Attorney, Agent, or Firm—Burns, Doane, Swecker & Mathis

[57] ABSTRACT

Conductivizing coating solutions prepared from cuprous iodide and ligands which are pyridine or monodentate pyridine derivatives provide excellent transparent, conductive coatings for use in electrophotographic and ground plane including articles. The coating compositions may also utilize solvents which solubilize the cuprous iodide-ligand complex formed. A method of forming transparent conductivizing coating solutions is also provided.

19 Claims, No Drawings

OTHER PUBLICATIONS

Wheland et al, "Synthesis of Electrically Conductive Organic Solids", Journal of the American Chemical Society, 98:13, (1976), pp. 3916–3925.

Kyle et al, "Dynamic Quenching of the Metal-to-Ligand Charge-Transfer Excited State of $Cu_4I_4$(pyridine)$_4$ Exciplex Formation and Self-Quenching", Journal of the American Chemical Society, (1989), 111, pp. 5005–5006.

Kyle et al, "Dual Photoemissions from the Room Temperature Solutions of the Tetranuclear from the Room Temperature Solutions of the Tetranuclear Copper(I) Clusters $Cu_4I_4$(py-X=Substituted Pyridine)", Journal of Chemical Society, Chem. Commun., (1989), pp. 714–715.

Lehn et al, "Helicates: Tetra-and Pentanuclear Double Helix Complexes of $Cu^I$ and Poly(bipyridien) Strands", Angew. Chew. Chem. Int. Ed. Engl. 27 (1988) No. 8, pp. 1095–1097.

Biagini et al, "Ligand Lability in and Electron Trnsfer of $[CO(py)_6]+$; Cyclotrimerisation of alkynes and Synthesis, Structure, and Properties of $(\eta_6-C_6Ph_6)CO(\eta^2-C_2Ph_2$ (py=pyridine)", J. Chem. Soc. Chem. Commun., (1989), pp. 405–407.

Vogler et al, "Photoluminescence of Tetrameric Copper(I) Iodide Complexes in Solution," J. Am. Chem. Soc., (1986), 108, pp. 7211–72712.

G, Tartarini, "Nuove reazioni cromatiche dei sali rameosi-Nota preliminare." Gazzetta Chimica Italina, vol. LXIII, (1933), pp. 597–601.

Tompkins et al, "Solid State Structures of Nonemitting Complexes of Cuprous Iodide: (CuI(methylquinaldate)$_x$(I), (CuI(isopropylquinaldate))$_2$(III) and (CuI(n-butylquinaldate))$_2$(III)", Inorganica Chimica Acta, 127 (1987), pp. 1–7.

Eitel et al, "Structural Isomers of Coper(I) Iodide Pyridine and their Luminescence Properties, Synthesis and Crystal Structure of a New Modification of CuI $NC_5NC_5H_5$", Z. Naturforsch (1980), pp. 1247–1253.

Davies et al, "Stoichiometery and Kinetics of the Oxidation of Halo(pyridine) copper(I) Complexes by Dioxygen in Aprotic Solvents. Effects of Copper(I) Reactant Molelcularity on the Rate Law and Evidence for Ligand-Dependent Product Structures", Inorganic Chemistry, (1983), vol. 22, No. 9, pp. 1257–1267.

Caulton et al, "Synthesis, Molecular Strucutures, Properties and Reactions of Halo and Carbonyl(Amine)Copper(I) Complexes", Polyhedron, (1990), vol. 9, No. 19, pp. 2319–2351.

Malik, "Co-ordination Compounds of Cuprous Iodide with Heterocyclic Amines", J. Inorg. Nucl. Chem. (1967), vol. 29, pp. 2106–2107.

Chow et al, "Nonaromatic Aminium Radicals", Chemical Reviews, (1978), vol. 78, No. 3, pp. 243–274.

Stolle et al, "Transparent Conductive Cuprous Iodide Layer", Chemical Abstracts, 95:195185f, vol. 95, (1981), p. 564.

Shinonome et al, "Cuprous Iodide-Containing Polymer Compositions for Electric Conductive for Coatings" Chemical Abstracts, 111:98491 1, (1989), p. 3.

CONDUCTIVIZING COATING SOLUTIONS AND METHOD OF FORMING CONDUCTIVE COATING THEREWITH

FIELD OF THE INVENTION

The present invention relates to transparent conductive coatings. More specifically, the invention relates to transparent conductive coatings prepared from conductivizing coating solutions containing cuprous iodide.

BACKGROUND OF THE INVENTION

Transparent conductive coatings are used for many applications, especially in the fields of transparent electrophotography and dielectric film recording. Generally, current commercial product designs use either vacuum evaporated aluminum or sputtered indium doped tin oxide as transparent conductive coatings such as ground planes, but both processes are very expensive. Other conductive coatings have been obtained from conductivizing coating solutions containing various semiconductor materials in solution. The metal-containing semiconductor material is sometimes used in a complexed form with a complexing agent in a solvent solution. Generally, after the solution is coated onto a substrate, the complexing agent and solvent are driven or washed off, leaving the transparent, conductive coating.

Chemical Abstracts 95:195185f (1981) discloses the preparation of a solution derived conductive coating with cuprous iodide dispersed in poly(vinyl alcohol) and/or carboxy-methyl cellulose and/or maleic anhydride-methacrylic acid ester copolymer. These coatings are disadvantageous because they require use of an acetonitrile solvent for the cuprous iodide. The use of acetonitrile is undesirable for conductive coatings since acetonitrile is quite toxic at the levels indicated.

Another method for preparing solution derived transparent conductive coatings is disclosed in U.S. Pat. No. 3,245,833, issued to Trevoy. The conductive coatings described comprise a metal-containing semiconductor compound such as cuprous iodide dispersed in an insulating, film-forming binder. As complexing agents with cuprous iodide, Trevoy '833 mentions nitrogen-containing compounds such as volatile alkyl amines and volatile nitriles, such as acetonitrile.

The soluble species formed when cuprous iodide is dissolved in acetonitrile is thought to be tetrakis-(acetonitrile)CuI which decomposes during the drying operation to yield finely divided particles of electrically conductive cuprous iodide dispersed throughout the coating layer.

The solution derived transparent conductive coatings shown in the Trevoy '833 patent have various disadvantages. Many of the complexing agents must be removed from the desolvated coatings by washing in order to achieve conductivity. Further, the use of aliphatic amines as solubilizing agents is complicated by deposition of sludge from the oxidatively unstable solutions obtained from aliphatic amines and cuprous iodide. Moreover, these conductivizing coating solutions provide coatings with a lack of uniformity and clarity on film substrates.

Other nitrogen-containing compounds are not useful as complexes with cuprous iodide for solution coating due to their insolubility. The analytical chemistry literature contains many examples of aromatic ligands, usually bidentates, useful in quantitative analyses to insolubilize copper salts, rather than solubilize them. Usually, the precipitation medium for these complexes has been water and the ligands, e.g. bipyridyl, biquinolyl, oxine, 1,10-phenanthroline, etc., have been found to form unstable colored solutions or precipitates. See generally, *Organic Analytic Reactants*, F. Welcher, D. Van Nostrand Co., N.Y., N.Y., 4th printing (1955).

Certain aromatic ligands containing nitrogen have been reported to form complexes with cuprous iodide which are soluble in organic solvents. Toluene solutions of substituted pyridine complexes with cuprous iodide were disclosed in a photoemission study by Kyle et al, *J. Chem. Soc. Chem. Commun.*, pp. 714–715 (1989). Vogler et al, *J. Am. Chem. Soc.*, 108:7211–7212 (1986), reported that cuprous iodide-pyridine complexes in benzene were unstable over time. Malik described stable complexes of cuprous iodide with pyridine and pyridine derivatives which are insoluble in water but soluble in organic solvents. *J. Inorg. Nuc. Chem.*, 29:2106–2107 (1967). Such complexes, however, have heretofore not been suggested as being plausible or useful in the preparation of conductive coatings.

There is a need in the conductivizing art for a complexing agent with cuprous iodide which can be dissolved at useful concentrations in solvents with relatively low toxicity, relatively low boiling point and relatively low cost. Moreover, there is a need in the art for conductivizing coating solutions with good volatility, solubility and stability towards oxygen. There is a particular need in the fields of electrophotography and dielectric film recording for a conductivizing coating solution which can form an inexpensive, transparent, conductive coating.

SUMMARY OF THE INVENTION

The present invention relates to a conductivizing coating solution comprising cuprous iodide, a ligand which forms a complex with cuprous iodide, said ligands having the structural formula:

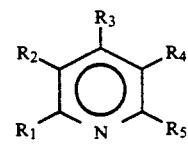

wherein $R_1$ is hydrogen or alkyl having 1–3 carbon atoms, $R_2$ is hydrogen, alkyl having 1–3 carbon atoms, —COOCH$_3$ or —COOCH$_2$CH$_3$, $R_3$ is hydrogen, alkyl having 1–3 carbon atoms or —COOCH$_2$CH$_3$, or $R_1$ and $R_2$ or $R_2$ and $R_3$ together form a six-membered aryl ring, $R_4$ is hydrogen, alkyl having 1–3 carbon atoms, —COOCH$_2$CH$_3$, —COOCH(CH$_3$)$_2$, —COO(CH$_2$)$_2$CH$_3$, —COO(CH$_2$)$_2$CH(CH$_3$)$_2$ or —CON(CH$_2$CH$_3$)$_2$, and $R_5$ is hydrogen or alkyl having 1–3 carbon atoms, and a binder resin.

In one aspect of the invention, the conductivizing coating solution further comprises a solvent capable of solubilizing the cuprous iodide-ligand complex formed. The transparent, conductive coating derived from the solution is comprised of highly transparent, semiconductive cuprous iodide substantially free of both solvent and ligand.

In another aspect, the invention is directed to a conductivizing coating solution comprising between about 0.1% and about 3.0% cuprous iodide, between about 0.1% and about 20% of the ligand and between about 1.0% to about 5.0% binder resin. Up to about 98.0% solvent capable of solubilizing the cuprous iodide-ligand complex is employed.

In a further aspect, the invention is directed to a transparent, conductive coating prepared from a conductivizing coating solution comprising cuprous iodide and a ligand which forms a complex with cuprous iodide, said ligands having the structural formula:

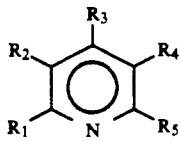

wherein $R_1$ is hydrogen or alkyl having 1-3 carbon atoms, $R_2$ is hydrogen, alkyl having 1-3 carbon atoms, —COOCH$_3$ or —COOCH$_2$CH$_3$, $R_3$ is hydrogen, alkyl having 1-3 carbon atoms or —COOCH$_2$CH$_3$, or $R_1$ and $R_2$ or $R_2$ and $R_3$ together form a six-membered aryl ring, $R_4$ is hydrogen, alkyl having 1-3 carbon atoms, —COOCH$_2$CH$_3$, —COOCH(CH$_3$)$_2$, —COO(CH$_2$)$_2$CH$_3$, —COO(CH$_2$)$_2$CH(CH$_3$)$_2$ or —CON(CH$_2$CH$_3$)$_2$, and $R_5$ is hydrogen or alkyl having 1-3 carbon atoms. A solvent capable of solubilizing the cuprous iodide-ligand complex formed also may be present in the conductivizing coating solution.

In a further aspect, the invention is directed to an electronically conductive coating obtained from the conductivizing coating solutions of the invention. In one embodiment of the invention, the electronically conductive coating is a ground plane coating.

In a further aspect, the invention is directed to a method of forming a transparent, conductive coating by coating the conductivizing coating solutions of the invention onto a substrate and drying the resulting coating.

DETAILED DESCRIPTION OF THE PREFERRED EMBODIMENTS

It now has been discovered that conductivizing coating solutions can be prepared from both solvent-free and solvent-based solutions of cuprous iodide and ligands which form a complex with cuprous iodide, said ligands having the structural formula:

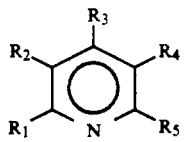

wherein $R_1$ is hydrogen or alkyl having 1-3 carbon atoms, $R_2$ is hydrogen, alkyl having 1-3 carbon atoms, —COOCH$_3$ or —COOCH$_2$CH$_3$, $R_3$ is hydrogen, alkyl having 1-3 carbon atoms or —COOCH$_2$CH$_3$, or $R_1$ and $R_2$ or $R_2$ and $R_3$ together form a six-membered aryl ring, $R_4$ is hydrogen, alkyl having 1-3 carbon atoms, —COOCH$_2$CH$_3$, —COOCH(CH$_3$)$_2$, —COO(CH$_2$)$_2$CH$_3$, —COO(CH$_2$)$_2$CH(CH$_3$)$_2$ or —CON(CH$_2$CH$_3$)$_2$, and $R_5$ is hydrogen or alkyl having 1-3 carbon atoms.

Surprisingly, these cuprous iodide-pyridine and -pyridine derivative ligand complexes can be dissolved at useful concentrations in a number of acceptable coating solvents which are low in toxicity, have a relatively low boiling point, and are low in cost. Hence, these complexes result in adequately stable solutions, yet the ligands are sufficiently volatile to allow insitu generation of a conductive coating of cuprous iodide via thermal expulsion of the ligands from the copper complex. Some of the ligands may be used without any solvent present in the solution. The ligands chosen for use in the conductivizing coating solutions of the present invention form complexes with the cuprous iodide in solution, e.g. (CuIPy)$_4$ and [CuI(Ethylnicotinate)]$_4$. The complexed CuI which results is surprisingly soluble in various common organic solvents, eliminating the need for using large amounts of toxic solvents such as acetonitrile as described above.

The conductivizing coating solutions of the invention are useful in any application requiring a transparent, conductive coating. A conductivizing coating solution useful for these applications will provide a transparent, conductive coating from which the ligand and solvent can be driven to leave a coating of cuprous iodide. The coating obtained is also generally of excellent uniformity. Many embodiments of the present invention comprise substantially clear transparent conductive coatings, which properties make these coatings especially useful as transparent conductive overcoats on insulating surfaces, for example, on a photographic film, a fabric, a printed surface, and the like. The coating solutions of the invention may be used to form coatings for surface resistance heaters, optical display devices, electrostatic discharge protection, electrophotography and dielectric film recording as well as in other fields which require transparent, conductive coatings. The coating solutions particularly are useful to form ground plane coatings, which are electronically conductive coatings used as a ground or reference potential.

The ligands useful in the conductivizing coating solutions of the present invention include pyridine and monodentate pyridine derivatives, among others. The chosen ligand should be volatile under conditions which would not destroy the substrate to be coated. Lower boiling ligands will be preferred for preparing coating solutions to be coated onto polymeric substrates. Higher boiling ligands may be used for preparing coating solutions to be used on substrates such as glass. The ligands chosen preferably form a ligand-cuprous iodide complex which is substantially soluble in the solvent to be utilized either at room temperature or upon heating to about 80° C. The complex will preferably be substantially stable to air to avoid oxidation of the complex.

Particularly preferred ligands are ethylnicotinate, diethylnicotinamide, pyridine, alkyl pyridine compounds, quinoline or isoquinoline. Pyridine and the alkylpyridines form excellent coating solutions with cuprous iodide, but are more oxygen sensitive than ethylnicotinate and diethylnicotinamide. Coating solutions containing pyridine or alkylpyridines preferably are used promptly after preparation or are stored under an inert atmosphere. Diethylnicotinamide coating solutions are quite stable in air, but may require more vigorous drying conditions than coating solutions formed with other ligands. Isoquinoline provides conductive coatings preferable to quinoline coatings. The most preferred ligands for use in the conductive coating solutions are pyridine, ethylnicotinate, diethylnicotinamide and isoquinoline. Ethylnicotinate is the most preferred ligand in terms of stability in air and volatility.

By way of contrast, the complex derived from methylnicotinate is not soluble even in the preferred coating solvents, discussed below.

The ligands in the coating solutions of the present invention are used in an amount which will, either alone or in combination with a solvent, substantially dissolve cuprous iodide at room temperature or when heated up to about 80° C. The ligands can solubilize cuprous iodide in a variety of acceptable coating solvents. Generally, the solvent will be heated to obtain up to about a 3% cuprous iodide concentration with about a 0.1% to about 20% ligand concentration, although the preferred solvents will solubilize up to about 5% cuprous iodide. Preferably, the cuprous iodide concentration is about 1% to about 2% by weight of the solution and a stoichiometric amount of the ligand up to about 2 times that amount is used. Generally, the ligand is present in an amount of between about 1% and about 5%. Most preferably, the ligand is present in an amount of between about 1% and about 4%.

The solvents useful in the present invention include those useful at room temperature or elevated temperature. Solvents which can solubilize the ligand-cuprous iodide complex at room temperature are preferred. The use of excess ligand markedly improves solubility in the solvents which solubilize the ligand-cuprous iodide complexes at elevated temperatures.

Examples of solvents suitable for aiding in the solubilization of the cuprous iodide-ligand complexes include, but are not limited to, toluene, cyclohexanone, butyl acetate, methyl isobutyl ketone, ethyl acetate, acetone, methyl ethyl ketone, 2-pentanone, 3-pentanone, 2-hexanone, 2-heptanone, 4-heptanone, methylisopropyl ketone, ethylisopropylketone, diisopropylketone, methyl t-butyl-ketone, acetyl acetone, diacetone alcohol, mesityl oxide, cyclopentanone, gamma-butyrolactone, N-methylpyrrolidone, N,N-dimethylacetamide, isophorone or a mixture of any of the above. Solvents which are preferably used at elevated temperature include toluene, ethyl acetate, methyl isobutyl ketone or methyl ethyl ketone or a mixture thereof. Solvents which may be used at room temperature include cyclohexanone, gamma-butyrolactone, N-methylpyrrolidone, N,N-dimethylacetamide or isophorone or a mixture thereof. The solvents used in the present invention are preferably free of peroxide. Especially preferred solvents include cyclohexanone, gamma-butyrolactone and methyl ethyl ketone (MEK) or mixtures thereof. The preferred solvent for use with quinoline and isoquinoline is N-methylpyrrolidone. Preferably, solvents which generally are used at elevated temperature are used in an admixture with solvents which generally are used at room temperature to optimize drying profiles, wetting properties and cost. In an especially preferred embodiment, a cyclohexanone:gamma butyrolactone solvent system is used in a ratio of about 70:30.

The ketone solvents listed are particularly preferred for the conductivizing coating solutions of the present invention. One of the advantages of the ketone solvents is that binder resins, found useful to impart improved physical durability to the coatings, are all moderately soluble in the ketone solvents, but generally are not soluble in the alternative solvents or in the solvent-free ligands themselves.

The amount of solvent present in the conductivizing coating solutions will vary depending on the ligand used and the concentration of cuprous iodide in the composition. For example, pyridine and cuprous iodide may be combined without the use of a solvent to provide a transparent, conductive coating of good quality. Cuprous iodide and 2,4,6-collidine or ethylnicotinate also can be combined without use of a solvent. The use of a solvent may be advantageous for economic reasons and for control of coating weight and substrate wetting. Solubilization of the cuprous iodide in the other related ligands may be best effected with the use of a solvent capable of solubilizing the cuprous iodide-ligand complex. The amount of solvent utilized will be substantially determined by the solubility of the complex to be solubilized. Preferably, the solvent will be present in an amount up to about 98%. Most preferably, the solvent will be present in an amount up to about 96%.

Physical durability of the conductive coating may be enhanced by the incorporation of a binder resin into the coating solutions. Possible binder resins which may be used include polyvinyl butyral resins (such as Butvar TM), styrene-acrylonitrile (SAN), polyvinylidene fluoride (Kynar) polyvinylidene chloride copolymers (Saran TM) and acrylic resins. In terms of coating clarity adhesion and conductivity, polyvinylidene chloride copolymers are the preferred binder resins for incorporation into the conductivizing coating solutions of the present invention. The binder resin will be present in the conductivizing coating solutions of the invention in an amount effective for physically enhancing the solutions. This amount generally will be between about 1.0% and about 10.0%, preferably about 1.0% to about 5.0%, as higher levels may drastically reduce the conductivity level. The conductivity level is believed to be related to the relative volume percent of CuI to resin, but a more convenient way to determine the amount of binder resin is to base the amount or weight of resin on the weight of CuI in the solution. It may be preferable to employ a thin overcoat of the resin to improve physical durability since this construction usually alters the conductivity level less than incorporation of the resin into the cuprous iodide solution itself.

Other agents may be added to the conductivizing coating solutions in order to improve certain properties of the coating. For example, it may be desirable to add an antioxidant compound to the coating solution to improve the storage life of the solution. Possible antioxidants include the mono-methyl ether of hydroquinone (MEHQ), and similar phenolic compounds known in the art. The most preferred antioxidant is MEHQ which has been shown to improve storage life without adversely affecting the accessible resistivity level of the conductivizing coating solution. The antioxidant will be present in the composition in an amount effective for improving the storage life of the solution. This will generally be an amount between about 0.1% and about 10%, based on the cuprous iodide.

Other agents which may be used include surfactants or wetting agents. Any such agents which are employed should not interfere with the desired properties of the coating solution or resulting coating.

To be useful as conductivizing coating solutions, the coatings obtained from the solutions of the present invention preferably measure an apparent surface resistivity of between about $10^4$ to about $10^{10}$ ohms per square. Surface resistivity refers to the resistance of conducting films that apparently behave as conductors transmitting currents primarily through the surface of the coating of electrically conducting material. Resistivity (specific resistance) is the usually accepted measurement for the conductive property of conducting and semiconducting materials. However, in the case of thin conductive coatings, measurement of the conductive property in terms of surface resistivity provides a value that is useful in practice and involves a direct method of measurement. It should be pointed out that the dimensional units for specific resistance (ohm-cm) and the unit for surface resistivity (ohms per square) are not equivalent and the respective measurements should not be confused. For an electrically conducting material whose electrical behavior is ohmic, the calculated resistance per square of a film of such material would be the specific resistance of the material divided by the film thickness, but this calculated resistance for a given material will not always coincide with measured surface resistivity, particularly in the case of a thin coated film. The surface resistivity of the coatings derived from the conductivizing coating solutions of the present invention is measured by use of a contact probe and megohmeter.

The conductivizing coating solutions of the present invention may be prepared by stirring a predetermined amount of powdered cuprous iodide in about ten to twenty fold that weight of a solvent for the complex to be formed, adding at least a stoichiometric amount of the chosen ligand, warming if desired to hasten dissolution of the cuprous iodide and finally diluting the complex solution to the desired final concentration with an additional solvent.

The conductivizing coating solutions may be applied by any of several well known means for depositing a coating solution such as: dip coating, spray coating, bead or fountain application on continuous coating machines, hopper or slot coating, Meyer rod coating, and gravure cylinder application and in each case either with or without heat. Drying the coated solution to remove volatile solvents and the solubilizing ligand is most advantageously done at elevated temperature. The drying temperature will depend on the substrate being coated and ligand to be volatilized. Temperature sensitive substrates will require lower drying temperatures, while higher temperatures can be used with substrates such as glass.

As with any film drying process where uniformity is desired, it was found important to avoid disturbing the wet film thickness during the drying via influences such as undue air turbulence in a drying oven. Such perturbations can induce thickness variations that give rise to haze as well as variations in electrical resistivity (both of which are undesirable) across a coated sample. It was repeatedly demonstrated that machine laid coatings are far more uniform than handmade laboratory draw downs dried in conventional laboratory forced draft ovens.

The conductivizing coating solutions of the present invention generally will be applied to a measured thickness determined by the conductivity required. The resulting coating may be used as an overcoat or as a subbing layer depending on the use. A variety of supports may be coated with the conductive coatings depending on the purpose of the article being prepared. Suitable materials for supports include polyesters, including thermoplastic polyesters, such as poly(ethylene terephthalate) (PET), polysulfone and polyamide. Other materials include glass, ceramics, and similar insulators. The conductivizing coating solutions of the present invention are generally coated onto a support such as polyester with or without the use of a subbing layer, but corona treatment can be useful. Preferably, the subbing layer is sufficiently thin so as not to absorb the cuprous iodide, which may destroy conductivity.

One of the preferred embodiments of the present invention is the use of the conductivizing coating solutions for an electronically conductive coating, most preferably a ground plane coating. In a preferred embodiment, the ground plane coating is prepared by dissolving CuI in gamma-butyrolactone or cyclohexanone using a complexing ligand, diluting to coating concentration with additional solvent, coating with a Meyer rod or gravure cylinder and drying at about 200°–230° F. in an oven.

The following examples are provided to further illustrate the invention, but are not meant to limit the scope of the invention in any way.

EXAMPLES

The following examples illustrate various combinations of cuprous iodide and the ligands of the invention with various solvents believed to be useful in coating solutions. The solutions prepared were assessed for solubility and stability.

COMPARATIVE EXAMPLE 1

A solution was attempted by stirring 90 g. acetonitrile, 10 g 2,4,6-collidine and 3.0 g CuI. The cuprous iodide would not dissolve. The precipitate was believed to be a CuI-collidine complex since a solution of 3.0 g CuI and 100 g collidine-free acetonitrile resulted in complete dissolution of the CuI.

EXAMPLE 1

A solution was prepared by stirring 25 g. collidine, 25 g. 2,6-lutidine and 1.0 g. CuI. The cuprous iodide did not completely dissolve. Fifty grams of cyclohexanone was added to the solution and all of the CuI dissolved. The resulting solution was then 1% in CuI.

EXAMPLE 2

A solution was prepared by stirring 45 g. n-butanol, 45 g. cyclohexanone, 10 g. collidine and 1.0 g. CuI. The CuI appeared to almost all dissolve, but then a solid, white precipitate formed. At 73° C., the precipitate dissolved to a provide a clear, very light amber solution.

EXAMPLE 3

A solution was prepared by stirring 90 g. toluene, 10 g. collidine, 5 g methyl ether of hydroquinone (MEHQ) and 1.0 g. CuI. All but a slight amount of the CuI dissolved. The solids left out of solution dissolved in a 75° C. tap water bath. The solution was a light amber.

EXAMPLE 4

A solution was prepared by stirring 90 g. cyclohexanone, 10 g. collidine, 5 g. MEHQ and 1.0 g. CuI. The solution was clear and there was no precipitate.

EXAMPLE 5

A solution was prepared by stirring 3% CuI in butyl acetate, 10% lutidine and 1% MEHQ. The cuprous iodide did not dissolve at 72° C. even with the addition of extra collidine. Addition of 10 g lutidine brought about dissolution of the cuprous iodide at 73° C. The lutidine complex apparently is more soluble than the collidine complex.

EXAMPLE 6

A solution was prepared by stirring 3% CuI in methyl isobutyl ketone (MIBK), 10% collidine and 1% MEHQ. The cuprous iodide did not all dissolve even at 73° C. The dissolution was better than with butyl acetate. When 10 g. of lutidine was added to the solution, the solid completely dissolved at 73° C.

EXAMPLE 7

A solution was prepared by stirring 2% CuI in ethyl acetate, 10% collidine and 1% MEHQ. The cuprous iodide would not all dissolve even at 73° C. Ten grams of lutidine were added and the solid completely dissolved at 73° C. but formed crystals at room temperature. The color of the solution was excellent.

EXAMPLE 8

A solution was prepared by stirring 3% CuI in methyl ethyl ketone, 10% collidine and 1% MEHQ. The cuprous iodide almost completely dissolved at 73° C. An extra 10 g. of lutidine was added and brought about complete dissolution of the CuI.

EXAMPLE 9

A solution was prepared by stirring 3% CuI, 40 g. MEK, 40 g. cyclohexanone, 20 g. pyridine and 1.0 g. MEHQ. The cuprous iodide dissolved readily at room temperature. The solution was a clear yellow-brown.

EXAMPLE 10

A solution was prepared by stirring 80 g. toluene, 20 g. pyridine, 1.0 g MEHQ and 3% CuI. The resulting solution was yellow and contained a small amount of undissolved CuI. Ten grams of cyclohexanone were added but the solution still contained some undissolved CuI. The solution was warmed to 73° C. and the solid CuI dissolved. The solution was cooled to room temperature. After one hour, crystals started to form on the bottom of the flask.

EXAMPLE 11

A solution was prepared by stirring 40 g. t-butanol, 40 g. cyclohexanone, 20 g. collidine, 1.0 g. MEHQ and 3.0 g. CuI. Only about one-half of the cuprous iodide was dissolved.

EXAMPLE 12

A solution was prepared by stirring 40 g. MEK, 40 g. MIBK, 20 g. collidine, 1.0 g. MEHQ and 3.0 g. CuI. The cuprous iodide was not soluble in the solution.

EXAMPLE 13

Using a 250 ml. Erlenmeyer flask, 1.0 g. of powdered cuprous iodide (Aldrich Chem. Co., 98%) was overlayed with 20 g. of gamma-butyrolactone followed by 2.0 g. of pyridine. Swirling the flask gently for several minutes resulted in dissolution at which time 77 g. of 2-butanone was added to afford a one weight percent CuI solution.

EXAMPLE 14

Using a 250 ml. Erlenmeyer flask, 1.0 g. of powdered cuprous iodide (Aldrich Chem. Co., 98%) was overlayed with 30 g. of gamma-butyrolactone followed by 2.0 g. of ethylnicotinate (Aldrich, 99%). Swirling the flask contents for several minutes under 72° C. tap water effected dissolution at which time 67 g. of cyclohexanone was added to afford a one weight percent CuI solution.

EXAMPLE 15

Using a 250 ml. Erlenmeyer flask, 1.0 g. of powdered cuprous iodide (Aldrich Chem. Co., 98%) was overlayed with 30 g. of gamma-butyrolactone followed by 2.0 g. of N,N-diethylnicotinamide (Aldrich, 99%). Swirling the flask contents for several minutes under 72° C. tap water effected dissolution at which time 67 g. of cyclohexanone was added to afford a one weight percent CuI solution.

The following examples illustrate the conductivity of the coatings resulting from the compositions of the present invention.

EXAMPLE 16

A solution was prepared by stirring 20% pyridine, 1% MEHQ and 3% CuI in methyl ethyl ketone. The cuprous iodide was completely dissolved with warming to form a clear yellow-brown solution. The coating solution was coated onto virgin polyethylene terephthalate (PET) with a #10 Meyer rod. The coating was dried for three minutes at 200° F. The resulting coating was hazy with what appeared to be crystals.

The solution prepared was cut with an equal weight of cyclohexanone resulting in a 1.5% CuI solution. The solution then was coated onto PET using a #10 Meyer rod. The coating was dried for three minutes at 250° F. which provided a coating much improved over the solution at 3% CuI. Surface resistivity of the coating was measured by a polished brass contact probe consisting of two one inch long by one eighth inch wide bars separated as sides of a one inch square and connected to a General Radio 1864 Megohmeter. The resistivity of the coating was $10^7$ ohms per square.

EXAMPLE 17

A solution was prepared by stirring 50 g. toluene, 30 g. cyclohexanone, 20 g. pyridine, 1.0 g. MEHQ and 3.0 g. CuI. All but a trace of the cuprous iodide was dissolved at room temperature to provide a yellow-brown solution. The solution was coated onto PET with a #10 Meyer rod and the coating was dried for three minutes at 200° F. The coating was quite uniform and had a resistivity of $10^7$ ohms per square.

The coating was redried for two minutes at 250° F. which made the sheet hazier. The resistivity was $10^9$ ohms per square. The coated sheet was wiped with a Webril litho pad which removed what appeared to be a top layer of hazy powder. The remaining coating had a resistivity of $10^5$ ohms per square.

EXAMPLE 18

A solution was prepared by stirring 90.0 g cyclohexanone, 5.0 g collidine and 1.0 g CuI. This solution was coated on a poly(ethylene terephthalate) support which had been bond coated with Saran, polyvinylidene chloride. The solution was coated onto the PET with a #10 Meyer rod and was then dried for five minutes at 200° F. The coating was reasonably good looking. The resistivity of the coating measured less than $0.50 \times 10^5$ ohms per square or about $10^4$ ohms per square. The bond coated PET with one coating of cuprous iodide solution was coated in a second draw down and then overcoated with 1% FC-310 Saran in cyclohexanone. The resistivity was measured to be about $10^4$ ohms per square.

The same solution then was coated on PET and treated with a 1% methyl ethyl ketone solution of Saran FC-310 overcoat. The resistivity remained unchanged.

The solution was coated on the back of a PET support to determine whether or not the solution would provide the same resistivity. The solution appeared to perform the same whether coated on the bonded side or the back of the PET support. It is believed that this might not be true where a thick bond coat is present since such a bond coat may destroy the conductivity.

EXAMPLE 19

A solution was prepared from 190 g. toluene, 10 g. collidine and 2.0 g. CuI. The solution was sherry colored and some precipitate was noted. The cuprous iodide all went into solution when the solution was warmed under tap water. The solution was coated onto PET with a #10 drying rod. The resulting coating looked good and measured a resistivity of $10^8$ ohms per square.

EXAMPLE 20

The following solutions were prepared:

| A | 1.0 g. CuI | A' | same as A with 0.05 g. |
|---|---|---|---|
| | 2.0 g. ethyl-nicotinate | | of Saran F-310 |
| | 20.0 g. butyrolactone | | (Dow Chem.) added as a |
| | 30.0 g. cyclohexanone | | 0.50 g. aliquot of 10 wt. % |
| | 47.0 g. methyl ethyl ketone | | soln. in MEK |
| | 100.0 | | |

Clear, pale brownish solutions were obtained.

Both A and A' gave uniform coatings on the virgin PET side of ICI-531 polyester base using a #10 Meyer rod, and drying 3 min. at 225° F. in a vented oven. A' is clearer than A but even A is virtually haze free. The Saran improves wetting and durability.

Both coatings measure $10^4$ $\Omega$/sq. using a 1/sq. in. contact probe and a General Radio 1864 Megohmmeter.

EXAMPLE 21

A solution of 1.0% CuI, 2.0% diethylnicotinamide, 19.4% butyrolactone and 77.6% methylethyl ketone was prepared. The solution was coated onto a PET base and dried. The coating measured a resistivity of $10^4$ to $10^5$ $\Omega$/sq. using a 1/square inch contact probe and a General Radio 1864 Megohmmeter.

EXAMPLE 22

A solution of 1.0% CuI, 0.79% ethylnicotinate, 20% butyrolactone, 20% cyclohexanone and 58.2% MEK was prepared, coated as in Example 21 and tested. The coating looked good and had a resistivity of $10^5$-$10^6$ $\Omega$/sq.

EXAMPLE 23

A solution of 0.97% CuI, 0.77% ethylnicotinate, 48.4% butyrolactone, 46.7% MEK and 3.10% N-methylpyrrolidone was prepared, coated as in Example 21 and tested. The coating looked good and had a resistivity of $10^5$-$10^6$ $\Omega$/sq.

EXAMPLE 24

A solution of 1.0% CuI, 2.0% ethylnicotinate, 20% butyrolactone, 47% MEK and 30% cyclohexanone was prepared, coated as in Example 21 and tested. The coating looked good and had a resistivity of $10^4$ $\Omega$/sq.

EXAMPLE 25

A solution of 1.0% CuI, 2.35% diethylnicotinamide, 20% butyrolactone, 30% cyclohexanone and 46.6% MEK was prepared, coated as in Example 21 and tested. The coating looked good and had a resistivity of $10^6$ $\Omega$/sq.

EXAMPLE 26

A solution of 2.0% CuI, 1.0% pyridine, 10% butyrolactone, 80% MEK and 10% N-methylpyrrolidone was prepared, coated as in Example 21 and tested. The coating looked good and had a resistivity of $<0.5\times10^5$ $\Omega$/sq.

EXAMPLE 27

A solution of 3.0% CuI, 2.0% α-picoline, 40% toluene and 20% N,N-dimethylacetamide was prepared, coated as in Example 21 and tested. The coating looked good and had a resistivity of $<0.5\times10^5$ $\Omega$/sq.

EXAMPLE 28

A solution of 1.0 g. CuI, 1.4 g. isoquinoline and 30.0 g. N-methylpyrrolidone was prepared. The CuI and isoquinoline were in a 1:2 ratio. The solution was dissolved by heating with 72° C. tap water. The resulting coating solution was coated on ICI 504 raw PET side (375 gauge) using a number 10 Meyer rod and dried two minutes at 220° F. The coating was very clear and iridescent and the resistivity was between $0.72\times10^8$ to $1.2\times10^8$ $\Omega$/sq.

EXAMPLE 29

A solution of 2.0 g. CuI, 1.4 g. isoquinoline and 30.0 g. N-methlylpyrrolidone solvent was prepared, coated and dried as in Example 28. The CuI and isoquinoline were in a 1:1 ratio and the solution was prepared by heating at 72° C. tap water. The coating was clear and blue and golden iridescent and had a resistivity of $5$-$7\times10^7$ $\Omega$/sq.

EXAMPLE 30

A solution of 2.0 g. CuI, 1.4 g. isoquinoline (1:1 ratio) and 50.0 g. N-methylpyrrolidone solvent was prepared. 46.6 g. cyclohexanone were added to get a 2% CuI solution. The coating solution was coated with a number 10 Meyer rod onto raw 7 mil PET and dried three minutes at 250° F. The coating was clear and excellent in appearance and its resistivity measured $1$-$2\times10^5$ $\Omega$/sq. over all but one corner of the sheet that had curled slightly in the oven draft. The coating solution was clear and a deep green-brown color by transmitted light. After three hours, the solution showed some precipitate that could be redissolved by heating again. A coating dried two minutes at 240° F. of the same solution also measured $1$-$2\times10^5$ $\Omega$/sq. resistivity.

EXAMPLE 31

A solution of 2.0 g. CuI, 1.4 g. quinoline (1:1 ratio) and 50.0 g. N-methylpyrrolidone solvent was prepared. The solution was dissolved under 72° C. tap water and resulted in a deep reddish brown solution. 46.6 g. of cyclohexanone was added to get a 2% CuI solution. The coating solution was coated with a number 10 Meyer rod onto raw 7 mil PET and was dried three minutes at 240° F. The resulting coating was nonuniform and was not as good as the isoquinoline coatings of Examples 28-30. The resistivity varied between $0.8 \times 10^6$ and $1.5 \times 10^8$ $\Omega$/sq.

EXAMPLE 32

A solution of 2.0 g. CuI, 1.4 g. isoquinoline (1:1 ratio), 50.0 g. N-methylpyrrolidone solvent, 46.6 g. cyclohexanone and 0.20 g. Lustran SAN 31-1,000 (10% on CuI) was prepared. The resulting coating solution was coated on 7 mil raw PET with number 10 Meyer rod and dried three minutes at 240° F. The coating had very good uniformity and clarity and was gold and blue iridescent and lustrous. The resistivity measured $13-20 \times 10^7$ $\Omega$/sq. The solution after time showed some precipitation, which crystals were redissolved upon reheating.

EXAMPLE 33

A solution of 50.0 g. N-methylpyrrolidone, 46.6 g. cyclohexanone and 0.10 g. Lustran SAN was dissolved with heat and a magnetic stirrer. 2.0 g. CuI and 1.4 g. isoquinoline were added to the solution and dissolved with heat. The resulting coating solution was coated on raw 7 mil PET with a number 10 Meyer rod and was dried two ways. First, one coating was dried three minutes at 240° F. The resistivity measured $6-9 \times 10^7$ $\Omega$/sq. A second coating was dried for six minutes at 240° F. with a resulting resistivity of $6-13 \times 10^7$ $\Omega$/sq. Both coatings were clear, uniform and gold-blue iridescent.

After 19 hours, the coating solution was examined for stability. The solution had deposited a large amount ($\approx 1$ g) of needle-like crystals which were dissolved by heating the solution under 72° C. tap water. The clear warm solution was coated onto raw 7 mil PET with a #10 Meyer rod and dried for three minutes at 250° F. to thoroughly remove all ligand. The resulting coating had excellent clarity and uniformity with blue-golden iridescent appearance. The measured resistivity was uniform over the entire $8\frac{1}{2} \times 11''$ area coated. The range was $1.7 \times 10^7$ to $4.0 \times 10^7$ $\Omega$/sq. The coating solution thus showed very good stability.

EXAMPLE 34

A solution of 2.0 g. CuI, 1.4 g. isoquinoline, 50.0 g. N-methylpyrrolidone solvent, 46.6 g. cyclohexanone solvent and 0.10 g. Butvar-VN resin was prepared. The resulting solution was coated onto raw 7 mil PET with a number 10 Meyer rod and dried three minutes at 240° F. The resulting coating was clear and uniform. The resistivity measured $2.6-6.0 \times 10^7$ $\Omega$/sq. The film was iridescent golden-blue.

EXAMPLE 35

A solution of 1% CuI, 0.7 g. isoquinoline, 0.10 g. SAN, 50 g. N-methylpyrrolidone and 50 g. cyclohexanone was prepared. The solution was spread in a thin film on a 2 inch by 3 inch glass microscope slide using a medicine dropper. The coating was dried for ten minutes at 240° F. The resulting resistivity was $2.5 \times 10^8$ $\Omega$/sq.

EXAMPLE 36

A solution of 1% CuI, 0.7 g. isoquinoline, 50 g. N-methylpyrrolidone and 50 g. of cyclohexanone was prepared. The solution was spread as a thin film on a 2 inch×3 inch glass microscope slide using a medicine dropper. The coating was dried for ten minutes at 240° F. The resulting coating had a resistivity of $3 \times 10^5$ $\Omega$/sq. and was transparent.

From the foregoing description, various modifications and changes in the composition and the method of using such composition will occur to those skilled in the art. All such modifications or changes coming within the scope of the appended claims are intended to be included therein.

What is claimed is:

1. A method of forming a transparent, conductive coating comprising:
    coating onto a substrate a conductivizing coating solution comprising an cuprous iodide and a ligand having the structural formula:

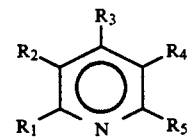

wherein $R_1$ is hydrogen or alkyl having 1-3 carbon atoms, $R_2$ is hydrogen, alkyl having 1-3 carbon atoms, —COOCH$_3$ or —COOCH$_2$CH$_3$, $R_3$ is hydrogen, alkyl having 1-3 carbon atoms or —COOCH$_2$CH$_3$, or $R_1$ and $R_2$ or $R_2$ and $R_3$ together form a six-membered aryl ring, $R_4$ is hydrogen, alkyl having 1-3 carbon atoms, —COOCH$_2$CH$_3$, —COOCH(CH$_3$)$_2$, —COO(CH$_2$)$_2$CH$_3$, —COO(CH$_2$)$_2$CH(CH$_3$)$_2$ or —CON(CH$_2$CH$_3$)$_2$ and $R_5$ is hydrogen or alkyl having 1-3 carbon atoms, to obtain a coating, and drying the coating to volatilize the ligand.

2. The method of claim 1, wherein the conductivizing coating solution further comprises a solvent capable of solubilizing the cuprous iodide-ligand complex formed.

3. The method of claim 2, wherein the ligand is ethylnicotinate, diethylnicotinamide or isoquinoline.

4. The method of claim 2, wherein the surface resistivity of the transparent, conductive coating is between about $10^4$ to about $10^{10}$ ohms per square.

5. The method of claim 2, wherein the substrate is poly(ethylene terephthalate).

6. The method of claim 1, wherein the conductivizing coating solution further comprises a binder resin.

7. The method of claim 2, wherein the conductivizing coating solution further comprises a binder resin.

8. A conductivizing coating solution comprising an effective conductive film forming amount of cuprous iodide in complex with a ligand having the structural formula

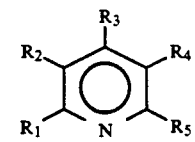

wherein $R_1$ is hydrogen or alkyl having 1-3 carbon atoms, $R_2$ is hydrogen, alkyl having 1-3 carbon atoms, —COOCH$_3$ or —COOCH$_2$CH$_3$, $R_3$ is hydrogen, alkyl having 1-3 carbon atoms or —COOCH$_2$CH$_3$, or $R_1$ and $R_2$ or $R_2$ and $R_3$ together form a six-membered aryl ring, $R_4$ is hydrogen, alkyl having 1-3 carbon atoms, —COOCH$_2$CH$_3$, —COOCH(CH$_3$)$_2$, —CCO(CH$_2$)$_2$CH$_3$, —COO(CH$_2$)$_2$(CH$_3$)$_2$ or —CON(CH$_2$CH$_3$)$_2$ and R$_5$ is hydrogen or alkyl having 1-3 carbon atoms, the solution further comprising a solvent which is methyl ethyl ketone, cyclohexanone, gama-butyrolacetone, N-methyl pyrrolidone, N,N-dimethylacetamide or mixtures thereof, with the amount of cuprous iodide in complex with the ligand being of an amount sufficient to provide a conductive coating upon a polymeric substrate having a surface resistivity in the range from about 10$^4$ to less than 10$^{10}$ ohms per square.

9. The conductivizing coating solution of claim 8, wherein the amount of cuprous iodide in complex with the ligand is of an amount sufficient to provide a conductive coating on a polymeric substrate having a surface resistivity of from about 10$^4$ to about 10$^8$ ohm per square.

10. The conductivizing coating solution of claim 8, wherein the ligand is pyridine, ethylnicotinate, diethylnicotinamide or isoquinoline.

11. The conductivizing coating solution of claim 8, further comprising an antioxidant.

12. The conductivizing coating solution of claim 11, wherein the antioxidant is mon-methyl ether or hydroquinone.

13. The conductivizing coating solution of claim 8, wherein the solution further comprises a binder resin.

14. The conductivizing coating solution of claim 13, wherein the binder resin is selected from the group consisting of polyvinylbutyral resins, styrene-acrylonitrile, polyvinylidine chloride copolymers and acrylic resins.

15. The conductivizing coating solution of claim 14, wherein the binder resin is a polyvinylidine chloride copolymer.

16. The conductivizing coating solution of claim 9, wherein the solution further comprises a binder resin.

17. The conductivizing coating solution of claim 9, wherein the ligand is pyridine, ethyl nicotinate, diethylnicotinamide or isoquinoline.

18. The conductivizing coating solution of claim 13, wherein the cuprous iodide is present in amount between about 1.0% and 3.0%, the ligand is present in an amount between about 1.0% and about 5.0%.

19. The method of claim 1, wherein the conductivizing coating solution comprises a solvent which is methyl ethyl ketone, cyclohexanone, gamma-butyrolactone, N-methylpyrolidone, N,N-dimethylacetamide or mixtures thereof.

* * * * *